(12) United States Patent
Mergen et al.

(10) Patent No.: US 8,521,113 B2
(45) Date of Patent: Aug. 27, 2013

(54) METHODS AND APPARATUS FOR PREDICTING A CHANNEL QUALITY INDICATOR IN A COMMUNICATION SYSTEM

(75) Inventors: Gokhan Mergen, San Jose, CA (US); Manini S. Shah, San Diego, CA (US); Nathaniel Lev Grossman, Los Gatos, CA (US); Nitin Kasturi, Los Gatos, CA (US); Yan Li, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 1292 days.

(21) Appl. No.: 12/109,436

(22) Filed: Apr. 25, 2008

(65) Prior Publication Data

US 2009/0203339 A1 Aug. 13, 2009

Related U.S. Application Data

(60) Provisional application No. 60/915,004, filed on Apr. 30, 2007.

(51) Int. Cl.
 *H04B 17/00* (2006.01)
(52) U.S. Cl.
 USPC .............. 455/226.4; 455/127.2; 455/295
(58) Field of Classification Search
 USPC .......... 455/127.2, 226.4, 226.3, 226.2, 226.1, 455/295
 See application file for complete search history.

(56) References Cited

U.S. PATENT DOCUMENTS

| | | | |
|---|---|---|---|
| 6,539,205 | B1 | 3/2003 | Wan et al. |
| 2004/0208133 | A1 | 10/2004 | Jay et al. |
| 2004/0240531 | A1 | 12/2004 | Black et al. |
| 2006/0105719 | A1 | 5/2006 | Itoh et al. |
| 2006/0171478 | A1 | 8/2006 | Schotten et al. |
| 2009/0215484 | A1* | 8/2009 | Ishii et al. ..................... 455/522 |
| 2010/0098030 | A1* | 4/2010 | Wang et al. .................... 370/335 |
| 2010/0234058 | A1* | 9/2010 | Hu et al. ......................... 455/522 |

FOREIGN PATENT DOCUMENTS

| | | |
|---|---|---|
| JP | 2002344383 A | 11/2002 |
| JP | 2004505491 | 2/2004 |
| JP | 2004140489 A | 5/2004 |
| JP | 2004159284 | 6/2004 |
| KR | 20050119650 A | 12/2005 |
| WO | WO2006108587 A1 | 10/2006 |

OTHER PUBLICATIONS

International Search Report—PCT/US08/062012—International Search Authority—European Patent Office, Sep. 18, 2008.
Written Opinion—PCT/US08/062012—International Search Authority—European Patent Office, Sep. 18, 2008.
European Search Report—EP12000582—Search Authority—The Hague—Apr. 20, 2012.
Taiwan Search Report —TW097115975—TIPO—Oct. 4, 2011.

* cited by examiner

*Primary Examiner* — Christian Hannon
(74) *Attorney, Agent, or Firm* — Abdollah Katbab

(57) ABSTRACT

Disclosed are methods and apparatus for predicting a channel quality indicator in a communication system, and in particular a delayed receiver. A disclosed method for determining the predictive channel quality indicator for a delayed receiver includes determining at least one channel quality indicator from a non-delayed receiver. The method also includes determining another channel quality indicator from the delayed receiver, and then calculating the predictive channel quality indicator for the delayed receiver through a function of the channel quality indicators from the non-delayed receiver and the channel quality indicator from the delayed receiver. Corresponding apparatus are also disclosed.

36 Claims, 4 Drawing Sheets

METHODS AND APPARATUS FOR PREDICTING A CHANNEL QUALITY INDICATOR IN A COMMUNICATION SYSTEM

CLAIM OF PRIORITY UNDER 35 U.S.C. §119

The present Application for Patent claims priority to Provisional Application No. 60/915,004 entitled "CHANNEL QUALITY INDICATOR (CQI) PREDICTION IN A COMMUNICATION SYSTEM" filed Apr. 30, 2007, and assigned to the assignee hereof and hereby expressly incorporated by reference herein.

BACKGROUND

1. Field

The present disclosure generally relates to methods and apparatus for predicting a channel quality indicator (CQI) in a communication system, and more particularly to predicting a CQI for a receiver based on a function of different CQI values.

2. Background

Channel state estimation and feedback of the channel state estimation are essential components of current and future wireless systems, such as High Speed Downlink Packet Access (HSDPA), Evolution Data Only/Optimized (EVDO), Ultra Mobile Broadband (UMB), and other similar systems. In such systems, the receiver at a device estimates a Channel Quality Indicator (CQI), e.g., a Signal-to-Noise Ratio (SNR) of the channel, and feeds it back to the transmitter of the device for proper scheduling.

An emerging trend in wireless receivers, however, is to use advanced offline or delayed receivers, which store samples for a period of time and then process these stored samples in batches using an equalizer, interference cancellation receiver, or other similar receiver. This approach, however, introduces significant delay due to waiting that occurs for the batch data to arrive, and due to computing parameters of the receiver. In addition, delay is introduced due to the particular application of the receiver (i.e., equalizer filtering, or interference cancellation).

A fundamental issue that arises is that such processing delay causes the CQI of the delayed receiver fed back to the transmitter to become stale (i.e., not current). For example, if the receiver chain introduces a $\Delta t$ time delay, then the reported CQI at a current time $t+\Delta t$ would be based on channel conditions at previous time t. Stale CQI reporting degrades the CQI-based scheduling performance and makes passing conformance tests problematic.

SUMMARY

According to an aspect, a method for determining a predictive channel quality indicator for a receiver in a communication system is disclosed. The method includes determining at least one first channel quality indicator from a first receiver, and determining at least one second channel quality indicator from a second receiver. The method further includes calculating the predictive channel quality indicator through a function of the at least one first channel quality indicator and the at least one second channel quality indicator.

According to another aspect, an apparatus for determining a predictive channel quality indicator for a receiver in a communication system is disclosed. The apparatus features at least one processor configured to determine at least one first channel quality indicator from a first receiver, and at least one second quality channel indicator from a second receiver. The processor is further configured to calculate the predictive channel quality indicator through a function of the at least one first channel quality indicator and the at least one second quality channel indicator. The apparatus also includes a memory coupled to the at least one processor.

According to yet another aspect, an apparatus for determining a predictive channel quality indicator for a receiver in a communication system is disclosed. The apparatus includes means for determining at least one first channel quality indicator from a first receiver, and means for determining at least one second quality channel indicator from a second receiver. The apparatus also includes means for calculating the predictive channel quality indicator through a function of the at least one first channel quality indicator and the at least one second quality channel indicator.

In still one other aspect, the present disclosure features a computer program product including computer-readable medium. The medium include code for causing a computer to determine at least one first channel quality indicator from a first receiver, code for causing a computer to determine at least one second quality channel indicator from a second receiver, and code for causing a computer to calculate the predictive channel quality indicator through a function of the at least one first channel quality indicator and the at least one second quality channel indicator.

DETAILED DESCRIPTION

The present application discloses methods and apparatus to predict the Channel Quality Indicator (CQI) for a receiver (or more particularly, a delayed receiver) in a communication system in order to mitigate problems due to processing delay. In particular, the disclosed methods and apparatus not only use a currently available CQI of a delayed receiver, but also utilize another set of CQIs obtained from a non-delayed receiver as well. The two types or groups of CQIs obtained from the respective receivers are optimally combined according to a predefined function of the CQI's to more optimally predict the CQI for the receiver (i.e., the delayed receiver) for feed back to the transmitter.

Figure 1:
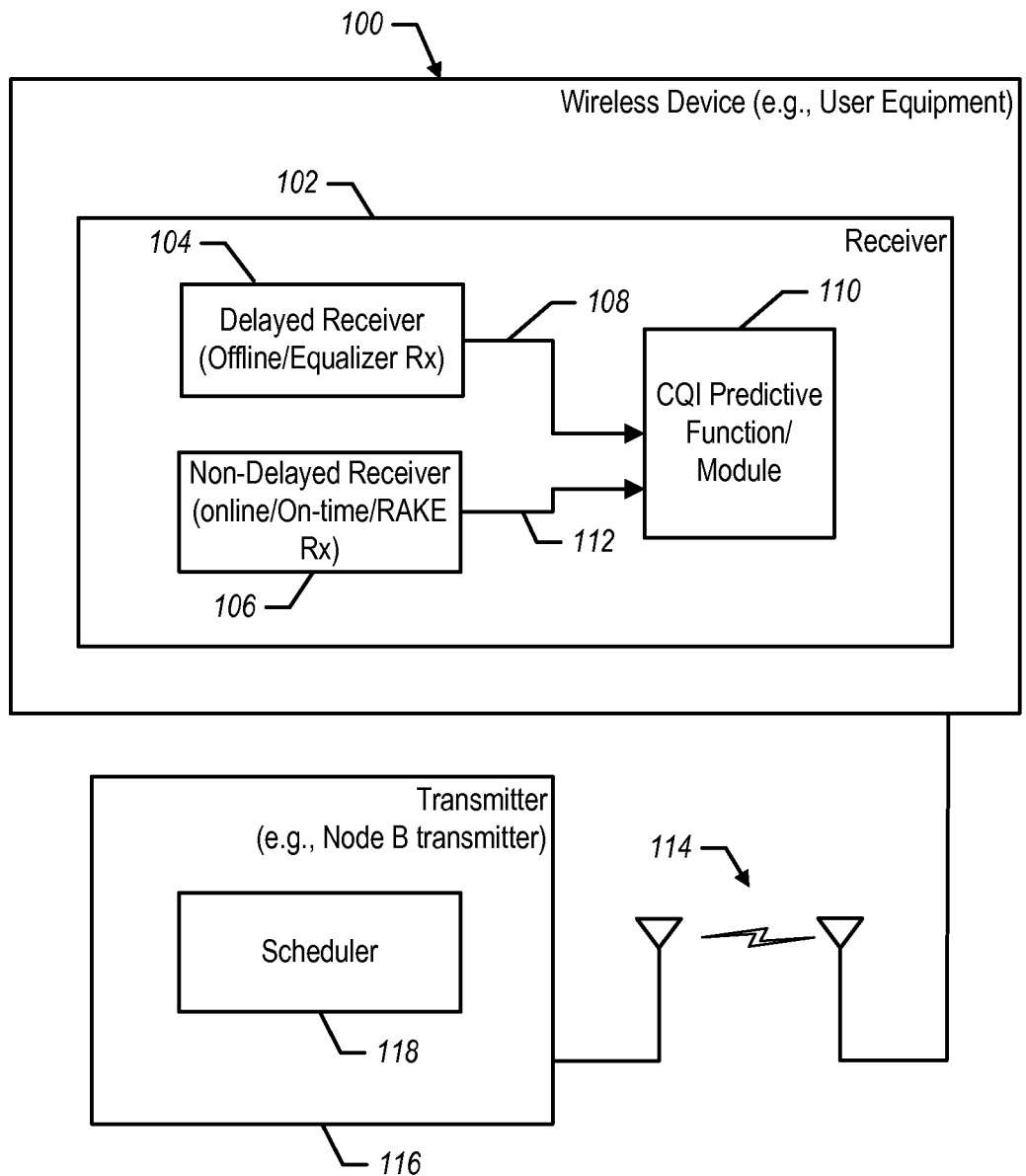
FIG. 1 is a block diagram of an apparatus used in a communication system for predicting a channel quality indicator.

Turning to FIG. 1, an apparatus 100, such as a user equipment (UE) as example, is illustrated that may be utilized to predict CQI for a receiver. Apparatus 100 includes a receiver 102 that receives wireless communication signals. According to an aspect, receiver 102 includes a delayed receiver unit or module 104 that receives the incoming signals and performs processing as described previously; i.e., batch processing using an equalizer or interference cancellation receiver which add processing delays. The receiver unit or module 104 is configured, at least in part, to calculate or determine a CQI value (hereinafter termed delayed receiver CQI or D_CQI).

Receiver 102 also includes a non-delayed receiver unit or module 106, which may be configured to simultaneously process (i.e., to the delayed receiver unit 104) the received communication signals and to calculate a non-delayed CQI (hereinafter termed non-delayed receiver CQI or ND_CQI). In an aspect, the non-delayed receiver unit or module 106 may be implemented with an on-time receiver (OTR) or online receiver. In general, however, the non-delayed receiver unit 106 may be implemented by any receiver whose time-line is not delayed or, at minimum, is delayed less than that of the delayed receiver unit 104. Furthermore, non-delayed receiver 106 may be implemented by a traditional RAKE receiver, such as those known a Code Division Multiplexed Access (CDMA) modems.

In an aspect, the non-delayed receiver unit 106 is configured to calculated CQI values periodically at essentially each current periodic time (i.e., without a significant delay) and store or buffer those values for a prescribed amount of time. Thus, in an aspect at least the CQI values determined a latest time (termed $t+\Delta t$) and at a last previous periodic time (termed t) can be derived from non-delayed receiver unit 106. It is noted that time t is generic and is not limited to a particular unit of time. Additionally, $\Delta t$ is generic change or passage of time also not necessarily limited to a particular quantitative amount.

A CQI value 108 is output by delayed receiver unit 104 to a CQI Predictive Unit 110. The CQI, according to one example, is the CQI determined for time t (i.e., D_CQI(t)). Two or more non-delayed CQI values 112 are also output to CQI Predictive Unit 110 by the non-delayed receiver unit 106. The values 112 may include the non-delayed CQI value determined previously at time t (i.e., ND_CQI(t)) and a presently determined non-delayed CQI value at time $t+\Delta t$ (i.e., ND_CQI($t+\Delta t$)).

The CQI Prediction unit 110 receives the input CQIs 108, 112 and calculates any one of various contemplated predictive functions using these values. The predictive function yields a predicted CQI for the delayed receiver at a current time (i.e., DR_CQI($t+\Delta t$)). Various examples of predictive functions will be discussed later in more detail.

As further illustrated in FIG. 1, CQI Predictive Unit 110 outputs the determined predicted CQI for the delayed receiver (i.e., DR_CQI($t+\Delta t$)) over a communication link 114 (e.g., a wireless uplink) to provide feedback to a transmitter 116, which may be a Node B transmitter serving device 100 within a communication system. The transmitter 116 includes or is in communication with a scheduler 118, which performs scheduling of system resources for the transmitter 116. By providing a predicted CQI for a current time, the transmitter 116 will more likely make scheduling decisions based on a less stale CQI compared to basing scheduling decisions only on D_CQI(t).

Figure 2:
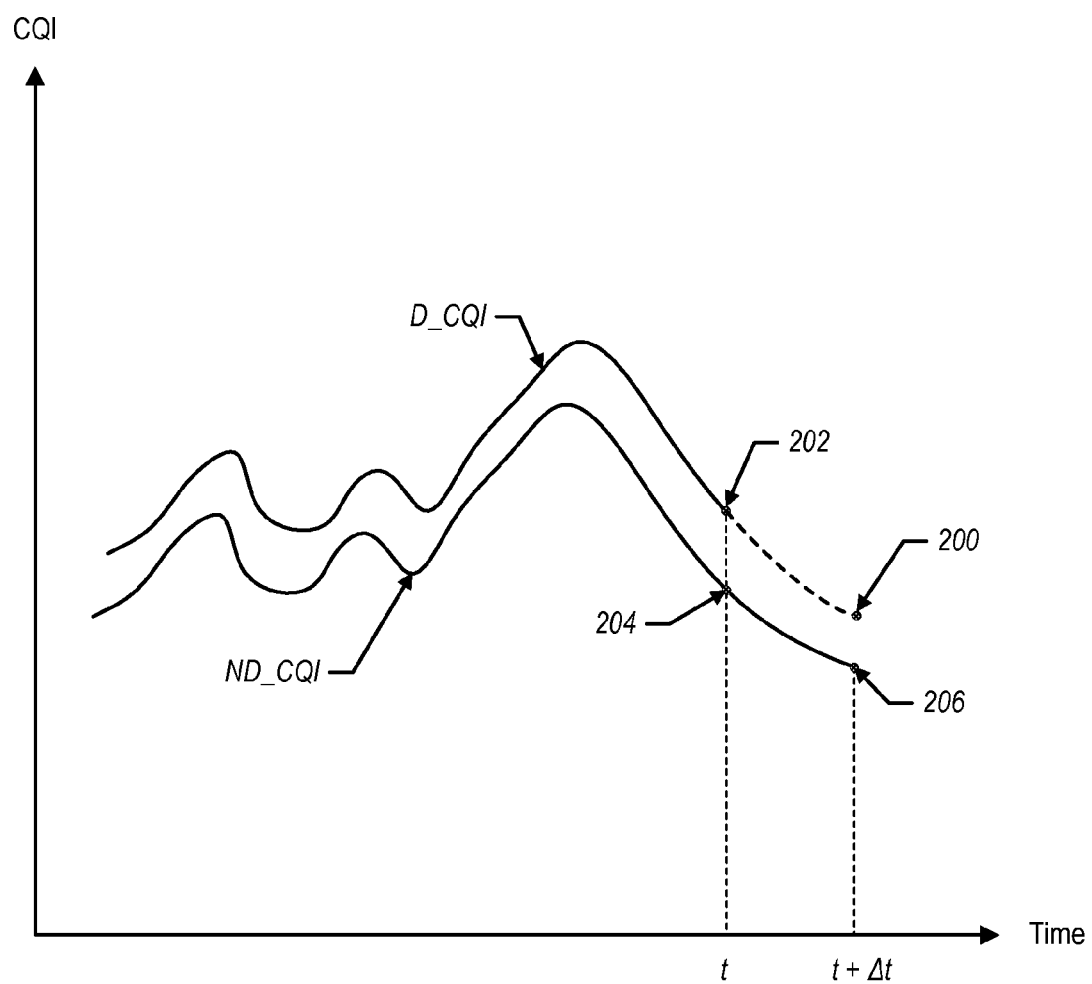
FIG. 2 is a graph of channel quality indicator values over time from both delayed and non-delayed receivers.

As is illustrated in FIG. 2, the D_CQI is roughly one time-unit (e.g., At) delayed from a current time ($t+\Delta t$). Therefore, the goal of the D_CQI prediction is to predict an upcoming D_CQI one time-unit later (i.e., D_CQI($t+\Delta t$) indicated by point 200 in FIG. 2) by using the currently available D_CQI (i.e., D_CQI(t) or approximately the CQI value at point 202 in FIG. 2) and other current and past ND_CQI data from the non-delayed receiver (e.g., approximately the CQI values of points 204 and 206 of curve ND_CQI in FIG. 2). Assuming that D_CQI(t) is available at time $t+\Delta t$ from the delayed receiver and that ND_CQI($t+\Delta t$), and ND_CQI(t) are available from the non-delayed receiver, a general form of a prediction function may be expressed by following equation (1):

$$D\_CQI_{predicted}(t+\Delta t)=a\, D\_CQI(t)+b\, ND\_CQI(t+\Delta t)+ c\, ND\_CQI(t) \quad (1).$$

The above equation indicates that the predicted upcoming $D\_CQI_{predicted}$ (i.e., D_CQI($t+\Delta t$)) is predicted as a linear combination of the previous D_CQI (i.e., D_CQI(t)), a current ND_CQI (i.e., ND_CQI($t+\Delta t$)) and the previous ND_CQI (i.e., ND_CQI(t)). The parameters a, b, and c are linear combining coefficients that ideally are optimized in an adaptive manner (depending on mobility, geometry etc.). It is noted, however, than according to an aspect where the implementation may be simplified, a fixed or predetermined approximation to the optimal adaptive a, b, c parameters is also contemplated. It is further noted that, according to an aspect, optimal values for parameters b or c could be zero, thus leaving only one non-delayed CQI value (i.e., either ND_CQI($t+\Delta t$) or ND_CQI(t)) being used in determining $D\_CQI_{predicted}$. Accordingly, in such an aspect, only one ND_CQI value may need to be determined.

In another example, a further prediction function or method is contemplated. In this example, it is again assumed that D_CQI(t) is available at time $t+\Delta t$ from the delayed receiver and that ND_CQI($t+\Delta t$), and ND_CQI(t) are available from the non-delayed receiver. Assuming these known CQIs, it is contemplated that a predictive estimate of D_CQI may be formed by the operation in equation (2) below.

$$D\_CQI_{predicted}(t+\Delta t)=D\_CQI(t)+c(ND\_CQI(t)- ND\_CQI(t+\Delta t)) \quad (2)$$

Thus, the predicted $D\_CQI_{predicted}$ at time $t+\Delta t$ obtained by equation (2) is the earlier value of the CQI of the delayed receiver (i.e., D_CQI(t)) plus a correction factor that depends on how the on-time or non-delayed CQI varied in the last period $\Delta t$ (i.e., the difference between ND_CQI(t) and ND_CQI($t+\Delta t$)). The value c is a predetermined constant used to optimally tailor the correction factor to the particular system specifics. It is noted that the method of equation (2) is beneficial in that it is simple and unbiased. In particular, equation (2) is simple in the sense that this kind of predictor may cause fewer problems because it does not exactly "mix" delayed and non-delayed CQIs, but rather simply uses non-delayed CQI variation to adjust the delayed CQI.

It is also noted that constant values a, b, or c discussed above in connection with above exemplary equations (1) or (2) can be chosen according to various adaptive algorithms such as recursive least squares (RLS) or least mean squares (LMS).

According to an aspect, the parameters a, b, and c can be chosen according to a Mean Square Error (MSE) criterion to minimize the prediction error. In particular, the MSE may be computed according to the following equation:

$$MSE=Average(D\_CQI(t+\Delta t)-D\_CQI_{predicted}(t+\Delta t)))^2 \quad (3)$$

In other words, the mean square error is the average of the square of the difference between the estimated predictive CQI (i.e., $D\_CQI_{predicted}(t+\Delta t)$) and the actual CQI (i.e., D_CQI ($t+\Delta t$)). As those skilled in the art will appreciate, this results in a simple optimization problem that can be solved using the least squares technique.

In yet a further aspect, the proposed CQI estimator can be made unbiased by infinite impulse response (IIR) filtering the difference of D_CQI (e.g., D_CQI(t)) and the predicted D_CQI (e.g., $D\_CQI_{predicted}$) according to following relationship:

$$unbiased\_D\_CQI_{predicted}(t+\Delta t)=D\_CQI(t+\Delta t)+ Filter\,[D\_CQI(t)-D\_CQI(t+\Delta t)]. \quad (4)$$

Figure 3:
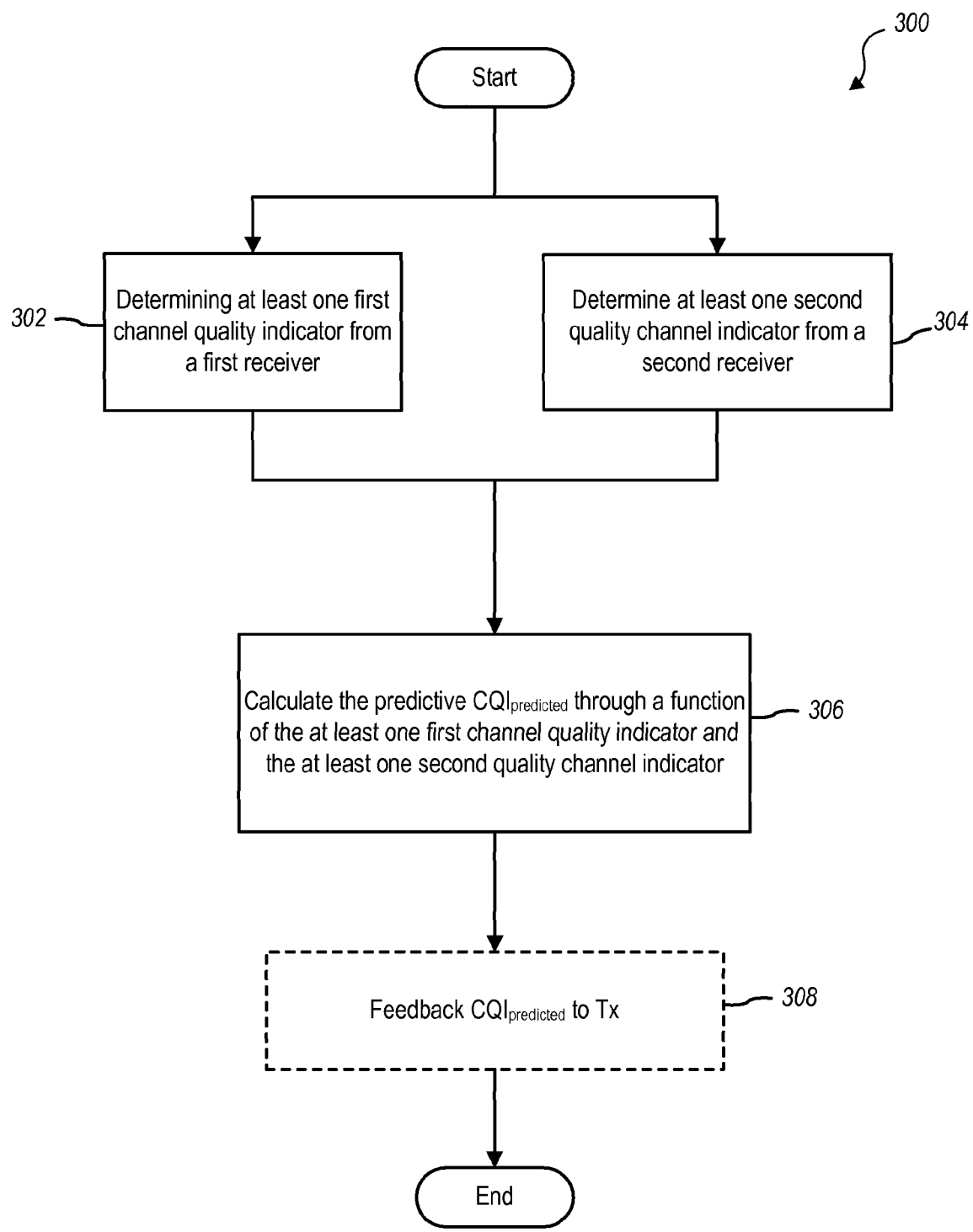
FIG. 3 is a flowchart of a method for predicting a channel quality indicator.

FIG. 3 illustrates flow chart of a basic method that is utilized for the determining a predictive CQI for a delayed receiver. After initialization, method 300 includes block 302 where at least one first channel quality indicator is determined from a first receiver. An example of this process may include unit 106 of FIG. 1 determining at least one non-delayed CQI and sending the CQI to predictive unit 110 (i.e., in the example of one of one of parameters b or c in equation (1) being set to zero). Another example is unit 106 determining a plurality of non-delayed CQIs for at least two different times (e.g., t and t+Δt) and sending the CQIs to predictive unit 110.

In parallel or simultaneous to the determinations of block 302, at least one second quality channel indicator is determined from a second receiver as illustrated by block 304. An example of the process of block 304 may include unit 104 of FIG. 1 determining at least one delayed CQI and sending the CQI to predictive unit 110.

After the plurality of first channel quality indicators and the at least one second channel quality indicators are determined in blocks 302 and 304, respectively, a predictive channel quality indicator is calculated as shown by block 306. In particular, the predictive CQI ($D\_CQI_{predicted}$) is calculated through a function of the at least one first channel quality indicator and the at least one second quality channel indicator. The process of block 306 may be effected by CQI Predictive Unit 110 illustrated in FIG. 1, as an example. Furthermore, examples of the specific function utilized may include any one of the examples discussed above.

After the predictive CQI is calculated in block 306, the method for determining this value (i.e., 300) is complete for a particular time t+Δt. Accordingly, although another block 308 is included to show that the predicted CQI ($D\_CQI_{predicted}$) is used typically as feedback to a transmitter Tx, such as transmitter 116 in the example of FIG. 1. This process in block 308, however, is not necessary for the practice of a method 300 to determine a predictive CQI, and thus block 308 is shown dashed, accordingly. It will also be appreciated by those skilled in the art that the process 300 may be repeated for each incremented time period Δt for continuous feedback to a transmitter.

Figure 4:
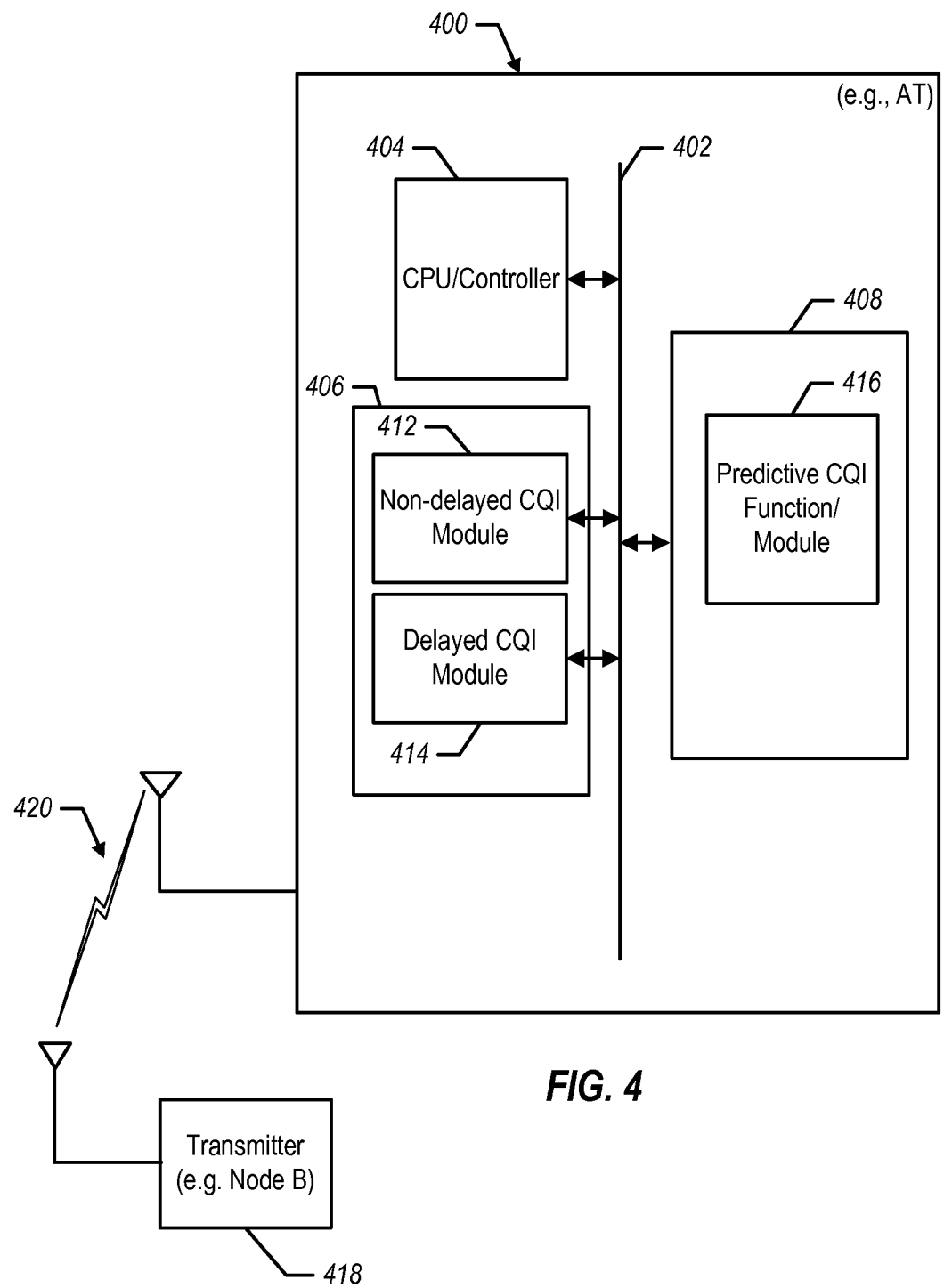
FIG. 4 is a block diagram of another apparatus used in a communication system for predicting a channel quality indicator.

FIG. 4 illustrates another apparatus 400 that may be determine and utilize a predictive channel quality indicator in accordance with the present disclosure. It is noted that apparatus 400 may constitute a user device, base station, one or more processors, or other applicable hardware/software/firmware for use in a communication system. As illustrated, the apparatus 400 includes a central data bus 402, or similar device for linking several circuits together. The circuits include a CPU (Central Processing Unit) or a controller 404, receiver circuits 406, and a memory unit 408, which may all communicate via bus 402.

The receiver circuits 406 further include a Non-delayed CQI Module 412, which is used to obtain the non-delayed CQI values (e.g., ND_CQI) as discussed previously, such as from a non-delayed receiver (not shown explicitly) that is also part of the receiver circuits 406. Receiver circuits 406 also includes a Delayed CQI Module 414 that obtains delayed CQI values (e.g., D_CQI) from the delayed receiver (also not shown explicitly) that is part of the receiver circuits 406. The CQI values obtained by modules 412 and 414 may be communicated via bus 402 to memory unit 408. In particular, the memory unit 408 may include a Predictive CQI Function/Module 416 as software (but not limited thereto, and could also be firmware). The module 416 applies a predictive CQI function, such as any of the previously disclosed algorithms and methods herein to calculate the predictive CQI of a delayed receiver (i.e., $D\_CQI_{predicted}$).

Apparatus 400 may communicate the $D\_CQI_{predicted}$ value to transmitter 418 via a wireless communication link 420. The transmitter 418, in turn, may utilize $D\_CQI_{predicted}$ as feedback useful for scheduling system resources.

The CPU/controller 406 performs the function of data management of the data bus 402 and further the function of general data processing, including executing the instructional contents of the memory unit 408. It is noted here that instead of separately implemented as shown in FIG. 4 as an alternative, any number of the circuits or modules can be incorporated as parts of the processor/CPU/controller 404. As a further alternative, the entire apparatus 400 may be implemented as an application specific integrated circuit (ASIC) or similar apparatus.

In the example of FIG. 4, the memory unit 408 may be a RAM (Random Access Memory) circuit. The exemplary portions, such as the function 416, are software routines, modules and/or data sets. The memory unit 408 can be tied to another memory circuit (not shown) which either can be of the volatile or nonvolatile type. As an alternative, the memory unit 408 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for determining a predictive channel quality indicator, the method comprising:
   determining at least one first channel quality indicator from a first receiver of a wireless device at a first time;
   determining at least one second channel quality indicator from a second receiver of the wireless device at a second time, wherein the second time is different than the first time; and
   calculating the predictive channel quality indicator through a function of the at least one first channel quality indicator and the at least one second channel quality indicator.

2. The method as defined in claim 1, wherein a plurality of first channel quality indicators are determined and each of the plurality occur at respective different points in time.

3. The method as defined in claim 1, wherein the first receiver is a non-delayed receiver.

4. The method as defined in claim 3, wherein the non-delayed receiver is a rake receiver.

5. The method as defined in claim 1, wherein the second receiver is a delayed receiver.

6. The method as defined in claim 5, wherein the delayed receiver is an equalizer.

7. The method as defined in claim 1, wherein the first receiver is a rake receiver and the second receiver is an equalizer.

8. The method as defined in claim 1, wherein the function comprises:

$$D\_CQI(t+\Delta t)=a\, D\_CQI(t)+b\, ND\_CQI(t+\Delta t)+c\, ND\_CQI(t)$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and a, b, and c comprise predetermined constant values.

9. The method as defined in claim 1, wherein the function comprises:

$$D\_CQI(t+\Delta t)=D\_CQI(t)+c(ND\_CQI(t)-ND\_CQI(t+\Delta t))$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and c comprises a predetermined constant value.

10. An apparatus for determining a predictive channel quality indicator, the apparatus comprising:
   at least one processor configured to:
      determine at least one first channel quality indicator from a first receiver of a wireless device at a first time;
      determine at least one second quality channel indicator from a second receiver of the wireless device at a second time, wherein the second time is different than the first time; and calculate the predictive channel quality indicator through a function of the at least one first channel quality indicator and the at least one second quality channel indicator; and a memory coupled to the at least one processor.

11. The apparatus as defined in claim 10, wherein a plurality of first channel quality indicators are determined and each of the plurality occur at respective different points in time.

12. The apparatus as defined in claim 10, wherein the first receiver is a non-delayed receiver.

13. The apparatus as defined in claim 12, wherein the non-delayed receiver is a rake receiver.

14. The apparatus as defined in claim 10, wherein the second receiver is a delayed receiver.

15. The apparatus as defined in claim 14, wherein the delayed receiver is an equalizer.

16. The apparatus as defined in claim 10, wherein the first receiver is a rake receiver and the second receiver is an equalizer.

17. The apparatus as defined in claim 10, wherein the function comprises:

$$D\_CQI(t+\Delta t)=a\,D\_CQI(t)+b\,ND\_CQI(t+\Delta t)+c\,ND\_CQI(t)$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and a, b, and c comprise predetermined constant values.

18. The apparatus as defined in claim 10, wherein the function comprises:

$$D\_CQI(t+\Delta t)=D\_CQI(t)+c(ND\_CQI(t)-ND\_CQI(t+\Delta t))$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and c comprises a predetermined constant value.

19. An apparatus for determining a predictive channel quality indicator, the apparatus comprising:
means for determining at least one first channel quality indicator from a first receiver of a wireless device at a first time;
means for determining at least one second channel quality indicator from a second receiver of the wireless device at a second time, wherein the second time is different than the first time; and
means for calculating the predictive channel quality indicator through a function of the at least one first channel quality indicator and the at least one second quality channel indicator.

20. The apparatus as defined in claim 19, wherein a plurality of first channel quality indicators are determined and each of the plurality occur at respective different points in time.

21. The apparatus as defined in claim 19, wherein the first receiver is a non-delayed receiver.

22. The apparatus as defined in claim 21, wherein the non-delayed receiver is a rake receiver.

23. The apparatus as defined in claim 19, wherein the second receiver is a delayed receiver.

24. The apparatus as defined in claim 23, wherein the delayed receiver is an equalizer.

25. The apparatus as defined in claim 19, wherein the first receiver is a rake receiver and the second receiver is an equalizer.

26. The apparatus as defined in claim 19, wherein the function comprises:

$$D\_CQI(t+\Delta t)=a\,D\_CQI(t)+b\,ND\_CQI(t+\Delta t)+c\,ND\_CQI(t)$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and a, b, and c comprise predetermined constant values.

27. The apparatus as defined in claim 19, wherein the function comprises:

$$D\_CQI(t+\Delta t)=D\_CQI(t)+c(ND\_CQI(t)-ND\_CQI(t+\Delta t))$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and c comprises a predetermined constant value.

28. A computer program product, comprising:
non-transitory computer-readable medium comprising:
code for causing a computer to determine at least one first channel quality indicator from a first receiver of a wireless device at a first time;
code for causing a computer to determine at least one second quality channel indicator from a second receiver of the wireless device at a second time, wherein the second time is different than the first time; and
code for causing a computer to calculate the predictive channel quality indicator through a function of the at least one first channel quality indicator and the at least one second quality channel indicator.

29. The computer program product as defined in claim 28, wherein a plurality of first channel quality indicators are determined and each of the plurality occur at respective different points in time.

30. The computer program product as defined in claim 28, wherein the first receiver is a non-delayed receiver.

31. The computer program product as defined in claim 30, wherein the non-delayed receiver is a rake receiver.

32. The computer program product as defined in claim 28, wherein the second receiver is a delayed receiver.

33. The computer program product as defined in claim 32, wherein the delayed receiver is an equalizer.

34. The apparatus as defined in claim 28, wherein the first receiver is a rake receiver and the second receiver is an equalizer.

35. The computer program product as defined in claim 28, wherein the code for causing a computer to calculate the predictive channel quality indicator further includes effecting the function:

$$D\_CQI(t+\Delta t) = a\, D\_CQI(t) + b\, ND\_CQI(t+\Delta t) + c\, ND\_CQI(t)$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and a, b, and c comprise predetermined constant values.

36. The computer program product as defined in claim 28, wherein the code for causing a computer to calculate the predictive channel quality indicator further includes effecting the function:

$$D\_CQI(t+\Delta t) = D\_CQI(t) + c(ND\_CQI(t) - ND\_CQI(t+\Delta t))$$

where $D\_CQI(t+\Delta t)$ is the predictive CQI at a time $t+\Delta t$, $D\_CQI(t)$ is the at least one second quality channel indicator comprising a previous delayed CQI at time t, $ND\_CQI(t+\Delta t)$ is one the plurality of first channel quality indicators comprising a non-delayed CQI at time $t+\Delta t$, $ND\_CQI(t)$ is another one the plurality of first channel quality indicators comprising a non-delayed CQI at time t, and c comprises a predetermined constant value.

* * * * *